United States Patent
Sugiyama et al.

(10) Patent No.: US 11,151,997 B2
(45) Date of Patent: Oct. 19, 2021

(54) DIALOG SYSTEM, DIALOG METHOD, DIALOG APPARATUS AND PROGRAM

(71) Applicants: NIPPON TELEGRAPH AND TELEPHONE CORPORATION, Chiyoda-ku (JP); OSAKA UNIVERSITY, Suita (JP)

(72) Inventors: Hiroaki Sugiyama, Soraku-gun (JP); Hiromi Narimatsu, Soraku-gun (JP); Yuichiro Yoshikawa, Suita (JP); Takamasa Iio, Suita (JP); Tsunehiro Arimoto, Suita (JP); Hiroshi Ishiguro, Suita (JP)

(73) Assignees: NIPPON TELEGRAPH AND TELEPHONE CORPORATION, Chiyoda-ku (JP); OSAKA UNIVERSITY, Suita (JP)

(*) Notice: Subject to any disclaimer, the term of this patent is extended or adjusted under 35 U.S.C. 154(b) by 159 days.

(21) Appl. No.: 16/491,280

(22) PCT Filed: Jan. 26, 2018

(86) PCT No.: PCT/JP2018/002512
§ 371 (c)(1),
(2) Date: Sep. 5, 2019

(87) PCT Pub. No.: WO2018/163648
PCT Pub. Date: Sep. 13, 2018

(65) Prior Publication Data
US 2020/0027455 A1 Jan. 23, 2020

(30) Foreign Application Priority Data
Mar. 10, 2017 (JP) .............................. JP2017-046362

(51) Int. Cl.
*G10L 15/22* (2006.01)
*G10L 15/18* (2013.01)
*G10L 15/30* (2013.01)

(52) U.S. Cl.
CPC .......... *G10L 15/22* (2013.01); *G10L 15/1815* (2013.01); *G10L 15/30* (2013.01); *G10L 2015/225* (2013.01); *G10L 2015/227* (2013.01)

(58) Field of Classification Search
USPC ..................................................... 704/1–504
See application file for complete search history.

(56) References Cited

U.S. PATENT DOCUMENTS 5,526,407 A * 6/1996 Russell ..................... G06F 3/16
379/88.01
7,672,841 B2 * 3/2010 Bennett ................... G10L 15/22
704/215

(Continued)

FOREIGN PATENT DOCUMENTS

| JP | 2015-135419 A | 7/2015 |
| JP | 2016-126293 A | 7/2016 |

OTHER PUBLICATIONS

International Search Report dated Apr. 17, 2018 in PCT/JP2018/002512 filed on Jan. 26, 2018.

(Continued)

*Primary Examiner* — Marcus T Riley
(74) *Attorney, Agent, or Firm* — Oblon, McClelland, Maier & Neustadt, L.L.P.

(57) ABSTRACT

It is an object of the present invention to provide a dialog technique that can reduce a user's uncomfortable feeling. A dialog system 100 is a dialog system that conducts a dialog with the user, the dialog system including a presentation part 50 that presents an action to fill a gap between a user utterance and a response utterance of the dialog system, after it is estimated or determined that the user utterance has (Continued)

ended or after a predicted time at which the user utterance ends, and before the dialog system makes a response utterance to the user utterance.

8 Claims, 4 Drawing Sheets

(56) References Cited

U.S. PATENT DOCUMENTS

| | | | | |
|---|---|---|---|---|
| 7,831,433 B1* | 11/2010 | Belvin | ..................... | G10L 15/18 |
| | | | | 704/275 |
| 8,380,503 B2* | 2/2013 | Gross | ..................... | G10L 17/02 |
| | | | | 704/246 |
| 8,489,399 B2* | 7/2013 | Gross | ..................... | G10L 17/02 |
| | | | | 704/260 |
| 8,494,854 B2* | 7/2013 | Gross | ..................... | H04L 63/102 |
| | | | | 704/246 |
| 8,583,282 B2* | 11/2013 | Angle | ..................... | G05D 1/0272 |
| | | | | 700/245 |
| 8,744,850 B2* | 6/2014 | Gross | ..................... | H04L 63/123 |
| | | | | 704/246 |
| 8,868,423 B2* | 10/2014 | Gross | ..................... | G10L 13/027 |
| | | | | 704/260 |
| 8,949,126 B2* | 2/2015 | Gross | ..................... | G10L 17/26 |
| | | | | 704/246 |
| 9,075,977 B2* | 7/2015 | Gross | ..................... | G10L 17/04 |
| 9,558,337 B2* | 1/2017 | Gross | ..................... | G10L 13/08 |
| 9,653,068 B2* | 5/2017 | Gross | ..................... | G10L 13/027 |
| 10,013,972 B2* | 7/2018 | Gross | ..................... | G10L 17/00 |
| 10,052,769 B2* | 8/2018 | Houssin | ............... | B25J 11/0005 |
| 10,276,152 B2* | 4/2019 | Gross | ..................... | H04L 63/123 |
| 2009/0319270 A1* | 12/2009 | Gross | ..................... | G10L 17/04 |
| | | | | 704/246 |
| 2009/0319271 A1* | 12/2009 | Gross | ..................... | G10L 17/06 |
| | | | | 704/246 |
| 2009/0319274 A1* | 12/2009 | Gross | ..................... | H04L 63/102 |
| | | | | 704/260 |
| 2013/0132093 A1* | 5/2013 | Gross | ..................... | G10L 15/02 |
| | | | | 704/273 |
| 2014/0020084 A1* | 1/2014 | Gross | ..................... | G10L 15/02 |
| | | | | 726/16 |
| 2014/0316786 A1* | 10/2014 | Gross | ..................... | G10L 13/027 |
| | | | | 704/260 |
| 2015/0039315 A1* | 2/2015 | Gross | ..................... | G10L 13/08 |
| | | | | 704/273 |
| 2015/0100157 A1* | 4/2015 | Houssin | ................. | G10L 15/19 |
| | | | | 700/246 |
| 2015/0206532 A1* | 7/2015 | Fujisawa | ................. | G10L 15/22 |
| | | | | 704/251 |
| 2015/0310198 A1* | 10/2015 | Gross | ..................... | G10L 15/063 |
| | | | | 726/19 |
| 2016/0246929 A1* | 8/2016 | Zenati | ..................... | H04N 5/77 |
| 2016/0328547 A1* | 11/2016 | Gross | ..................... | G10L 17/06 |
| 2016/0328548 A1* | 11/2016 | Gross | ..................... | G10L 17/02 |
| 2016/0329046 A1* | 11/2016 | Gross | ..................... | G10L 17/22 |
| 2020/0013403 A1* | 1/2020 | Sugiyama | ............... | G10L 13/00 |
| 2020/0027455 A1* | 1/2020 | Sugiyama | ............... | G10L 15/22 |

OTHER PUBLICATIONS

Kawahara, T., "Toward Dialogue System with Conversational Utterance", Information Processing, vol. 45, No. 10, 2004, 19 pages (with English translation).

Arimoto, Y. et al., "Impression Evaluation of Dialogue without Voice Recognition by Plural Robots", Conference of the Robotics Society of Japan, 2016, 9 pages (with partial English translation).

Sugiyama, H. et al., "Leveraging Dependency Relations and Sentence Examples in Web-scale Corpus for Open-domain Utterance Generation", Transactions of the Japanese Society for Artificial Intelligence, vol. 30, No. 1, 2015, 22 pages (with partial English translation).

Meguro, T. et al., "Building a conversational system based on the fusion of rule-based and stochastic utterance generation", Proceedings of the 28th Annual Conference of the Japanese Society for Artificial Intelligence, vol. 28, 2014, 8 pages (with partial English translation).

Fujimoto, M., "The Fundamentals and Recent Progress of Voice Activity Detection", The Institute of Electronics, Information and Communication Engineers, IEICE Technical Report, SP2010-23 , 2010, 7 pages (with partial English translation).

* cited by examiner

DIALOG SYSTEM, DIALOG METHOD, DIALOG APPARATUS AND PROGRAM

TECHNICAL FIELD

The present invention relates to a technique applicable to robots or the like communicating with humans allowing a computer to have a dialog with humans using a natural language or the like.

BACKGROUND ART

In recent years, research and development on robots communicating with humans has been progressing and put to practical use at various scenes. For example, at the site of communication therapy, there is a usage pattern in which a robot serves as a companion to talk with a person feeling loneliness. More specifically, a robot plays a role of a listener to a tenant at elder care facilities, and can thereby heal the loneliness of the tenant, show the tenant having conversation with the robot, and have chances to start conversation between the tenant and people around the tenant such as his/her family and nurses. In addition, at the site of a communication training, for example, there is a usage pattern in which a robot becomes a training partner. More specifically, the robot becomes a training partner for foreign language learners at foreign language learning facilities, thus helping the foreign language learners to efficiently proceed with foreign language learning. Furthermore, in an application as an information presentation system, robots have a dialog with each other and have their dialog heard by people as a basis, sometimes talk to people, cause the people to join in conversation without making the people bored, and can thereby present information in a form easily acceptable to the people. More specifically, when people feel bored at meeting places like bus stops, a platform at a station or the like in a town or when people can afford to participate in a dialog at home or a classroom or the like, it is possible to expect efficient presentation of information such as news, merchandise introduction, introduction of a store of information or knowledge, education (for example, nursery and education of children, education in the liberal arts for adult people, moral enlightenment). Furthermore, in an application as an information collection system, there is a usage pattern in which a robot collects information while talking to people. Since it is possible to maintain a feeling of dialog through communication with the robot, the system can gather information without giving people any feeling of oppression that they are being listened to by a third party. More specifically, the system is expected to be applicable to a personal information survey, a market survey, a merchandise evaluation, a taste investigation for recommended commodity or the like. Thus, a variety of applications are expected from communication between humans and robots, and an implementation of a robot that interacts with users more naturally is expected. With the wide spread of smartphones, chat services such as LINE (registered trademark) are also realized whereby a plurality of users chat with each other substantially in real time, enjoying conversation among the users. By applying a technique of conversation between users and robots to this chat service, it is possible to implement a chat service whereby robots can have conversation with users more naturally even in the absence of any user as a chatting partner.

In the present specification, hardware which becomes a dialog partner of a user such as robots used in these services or chatting partner or computer software for causing a computer to function as hardware to become the user's dialog partner are generically called an "agent." Since the agent is intended to become the user's dialog partner, the agent may be personified such as a robot or chatting partner, personalized or may possess characters or individuality.

The key to the implementation of these services is a technique that enables the agent implemented by hardware or computer software to have a dialog with humans naturally.

An example of the above-described agent is a voice dialog system described in Non-Patent Literature 1 that voice-recognizes a user utterance, understands/infers intention of the utterance and gives an appropriate response. Research on voice dialog systems has been actively carried out with the development of voice recognition technology and has been put to practical use in automatic voice response systems, for example.

Another example of the above-described agent is a scenario dialog system that has a dialog with a user about a specific topic in accordance with a predetermined scenario. The scenario dialog system allows the user to continue a dialog as long as the dialog develops in accordance with the scenario. For example, a dialog system described in Non-Patent Literature 2 is a system that develops a dialog between a user and a plurality of agents while including interruptions by the agents or exchanges between the agents. For example, an agent utters a question prepared in a scenario to the user and when the utterance of an answer from the user to the question corresponds to an option prepared in the scenario, the agent functions to make an utterance corresponding to the option. That is, the scenario dialog system is a dialog system in which the agent makes an utterance based on a scenario stored in advance in the system. In this dialog system, the agent asks a question to the user, and when the agent receives an answer from the user, the agent may fend off the question by nodding "I see" regardless of contents of the user utterance or the agent may interrupt the dialog by changing the topic, and can thereby respond in such a way that even when the user utterance is deviated from the original topic, the user will not feel a breakup of the story.

A further example of the above-described agent is a chat dialog system in which the agent makes an utterance along with utterance contents of the user so that the user and the agent develop a natural dialog. For example, a dialog system described in Non-Patent Literature 3 is a system for implementing a chat dialog between the user and the system in which while focusing on matters peculiar to the context in a plurality of dialogs made between the user and agent, the system makes an utterance according to a prescribed rule using a word included in the utterance of the user or agent as a trigger. The rule used by the chat dialog system is not only the prescribed one but may also be one automatically generated based on contents of the user utterance or may be one automatically generated based on an immediately preceding utterance made by the user or agent or an utterance made in the vicinity thereof or may be one automatically generated based on an utterance at least including an immediately preceding utterance made by the user or agent or an utterance made in the vicinity thereof. Non-Patent Literature 3 describes a technique of automatically generating a rule based on words in a co-occurrence relation or in a dependency relation with words included in a user utterance. A dialog system described, for example, in Non-Patent Literature 4 is a system in which a manually described rule is merged with a rule described using a statistical utterance generation technique to thereby reduce the rule generation cost. Unlike the scenario dialog system, the chat dialog system is not such a system in which the agent makes an utterance in accordance with a prepared scenario, and so there will be no such situation that the agent's utterance does not correspond to the user utterance and the agent can make an utterance based on at least contents of the user utterance or an immediately preceding utterance made by the user or agent or an utterance made in the vicinity thereof. That is, the chat dialog system is a dialog system in which the agent makes an utterance based on at least contents of the user utterance or an immediately preceding utterance made by the user or agent or an utterance made in the vicinity thereof. These chat dialog systems can explicitly respond to the user utterances.

PRIOR ART LITERATURE

Non-Patent Literature

Non-Patent Literature 1: Tatsuya Kawahara, "Voice Dialog System Using Spoken Language," Information Processing, vol. 45, no. 10, pp. 1027-1031, October 2004
Non-Patent Literature 2: Yasuhiro Arimoto, Yuichiro Yoshikawa, Hiroshi Ishiguro, "Impression Evaluation of Dialog without Voice Recognition by Plural Robots," Conference of the Robotics Society of Japan, 2016
Non-Patent Literature 3: Hiroaki Sugiyama, Toyomi Meguro, Ryuichiro Higashinaka, Yasuhiro Minami, "Dependency Relation with User Utterance Having Arbitrary Topic and Generation of Response Sentences Using Examples," Transactions of the Japanese Society for Artificial Intelligence, vol. 30 (1), pp. 183-194, 2015
Non-Patent Literature 4: Toyomi Meguro, Hiroaki Sugiyama, Ryuichiro Higashinaka, Yasuhiro Minami, "Construction of Dialog System Based on Merge of Generation of Rule-Based Utterance and Generation of Statistical Utterance," Transactions of the Japanese Society for Artificial Intelligence, vol. 28, pp. 1-4, 2014

SUMMARY OF THE INVENTION

Problems to be Solved by the Invention

However, the user may have an uncomfortable feeling at any time after the user utterance ends until the agent starts a response utterance.

Figure 3:
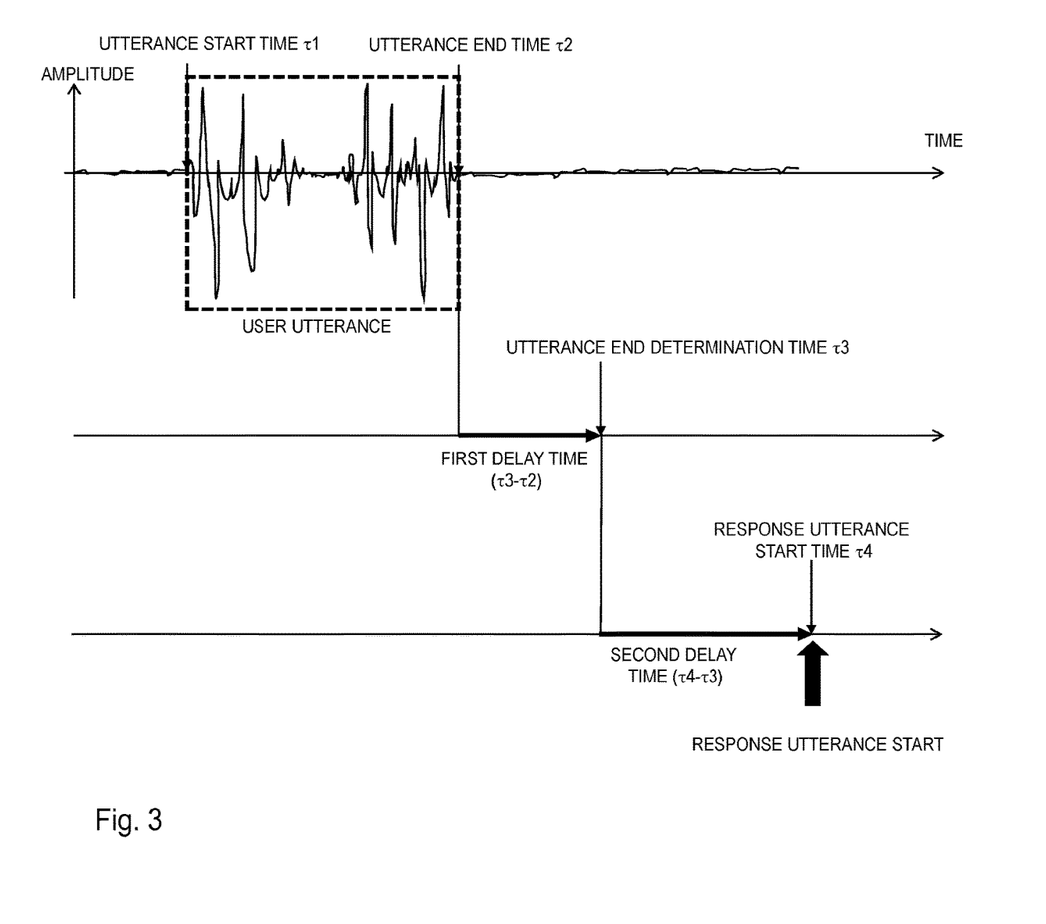
FIG. 3 is a diagram for describing a prior art.

For example, as shown in FIG. 3, it is assumed that an utterance start time at which the user starts an utterance is $\tau 1$, an utterance end time at which the user utterance ends is $\tau 2$, a time at which it is determined that $\tau 2$ is the time at which the user utterance ends is an utterance end determination time $\tau 3$ and a response utterance start time which is a time at which an utterance of the agent response to the user utterance is generated and started is $\tau 4$. The vertical axis in FIG. 3 represents amplitude of an acoustic signal collected by a microphone to collect the user utterance and the horizontal axis represents a time.

In the example in FIG. 3, after the time $\tau 2$ at which the user utterance ends until the time $\tau 4$ at which an utterance of the agent response to the user utterance is generated and started, a first delay time $\tau 3$-$\tau 2$ which is a delay of determination of an utterance end and a second delay time $\tau 4$-$\tau 3$ which is a delay of utterance generation are generated.

Due to the first delay time and the second delay time, the user may feel that the agent's response to the user utterance is slow, that is, the user may have an uncomfortable feeling with the dialog with the agent.

It is an object of the present invention to provide a dialog system, a method, an apparatus and a program that reduce an uncomfortable feeling of the user.

Means to Solve the Problem

In order to solve the above-described problem, a dialog system according to a first aspect of the present invention is a dialog system that conducts a dialog with a user, the dialog system comprising a presentation part that presents an action to fill a gap between a user utterance and a response utterance of the dialog system after the user utterance is estimated or determined as having ended or after a predicted time at which the user utterance is predicted to end, and before the dialog system makes a response utterance to the user utterance.

Effects of the Invention

According to the present invention, the dialog system presents an action to fill a gap between a user utterance and a response utterance of the dialog system after the user utterance is estimated or determined as having ended or after a predicted time at which the user utterance is predicted to end, and before the dialog system makes a response utterance to the user utterance, and can thereby reduce the user's uncomfortable feeling.

DETAILED DESCRIPTION OF THE EMBODIMENTS

Hereinafter, embodiments of the present invention will be described in detail. Note that components having the same functions in the accompanying drawings are assigned the same reference numerals and overlapping description will be omitted.

Embodiment

Figure 1:
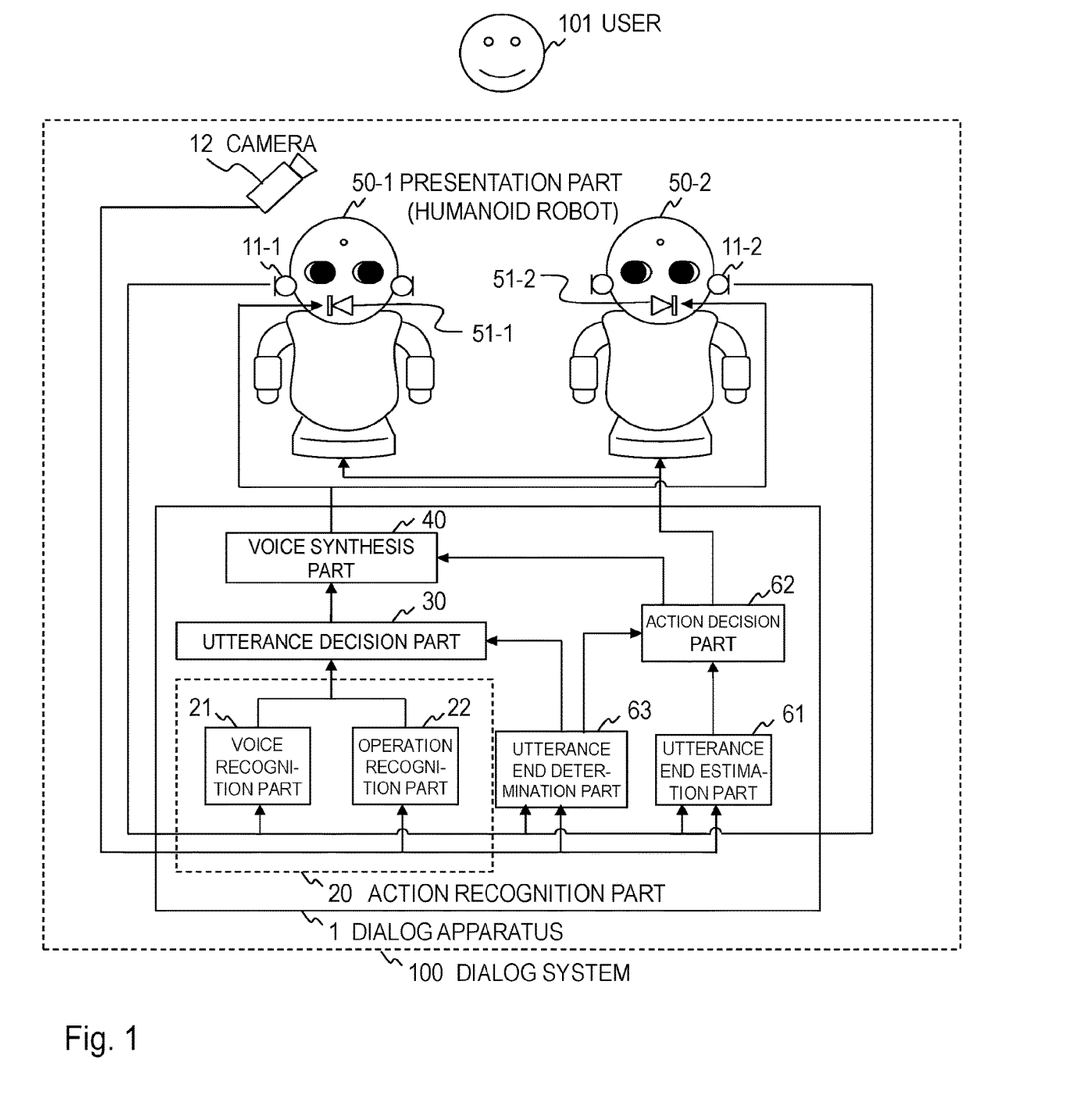
FIG. 1 is a diagram illustrating a functional configuration of a dialog system of an embodiment.

The dialog system according to the embodiment is a system in which a plurality of humanoid robots cooperate to have a dialog with a user. That is, the dialog system according to the embodiment is an example of a case where the agent is a humanoid robot. As shown in FIG. 1, the dialog system 100 includes, for example, a dialog apparatus 1, an input part 10 made up of a microphone 11 and a camera 12, and a presentation part 50 provided with at least a speaker 51. The dialog apparatus 1 is provided with, for example, an action recognition part 20, an utterance decision part 30, a voice synthesis part 40, an utterance end estimation part 61, an action decision part 62 and an utterance end determination part 63. The action recognition part 20 is provided with, for example, a voice recognition part 21 and an operation recognition part 22. The dialog system 100 performs processes in respective steps, which will be described later, and thereby implements a dialog method of the embodiment.

The dialog apparatus 1 is a special apparatus configured by causing a well-known or dedicated computer provided with, for example, a central processing unit (CPU) and a main storage apparatus (RAM: Random Access Memory) to read a special program. The dialog apparatus 1, for example, executes each process under the control of the central processing unit. Data inputted to the dialog apparatus 1 and data obtained through each process are stored, for example, in the main storage apparatus, and the data stored in the main storage apparatus is read as required and used for other processes. Furthermore, at least part of each processing part of the dialog apparatus 1 may be constructed of hardware such as an integrated circuit.

The input part 10 may be configured to be integral with or partially integral with the presentation part 50. In the example in FIG. 1, microphones 11-1 and 11-2 which are parts of the input part 10 are mounted on the heads (positions of the ears) of humanoid robots 50-1 and 50-2 which are the presentation parts 50. In the example in FIG. 1, the camera 12 which is a part of the input part 10 is provided independently, but, for example, the camera 12 may be mounted on the heads (positions of the eyes) of the humanoid robots 50-1 and 50-2. In the example in FIG. 1, although the presentation part 50 is constructed of two humanoid robots 50-1 and 50-2, the presentation part 50 may also be constructed of one humanoid robot or three or more humanoid robots.

The input part 10 is an interface for the dialog system 100 to acquire at least one of a user utterance (verbal action) and operation (non-verbal action). In other words, the input part 10 is an interface to input a user's action to the dialog system 100. The input part 10 is, for example, a microphone 11 for collecting a user utterance voice and converting it to a voice signal. When the input part 10 is a microphone, the input part 10 may be enabled to collect an utterance voice uttered by the user 101. That is, FIG. 1 is an example and either one of the microphone 11-1 or 11-2 may not be provided. Furthermore, one or more microphones provided in places different from the humanoid robots 50-1 and 50-2 in the vicinity of the user 101 or a microphone array provided with a plurality of microphones are used as the input part so as to adopt a configuration not provided with both the microphones 11-1 and 11-2. The microphone 11 outputs an acoustic signal including the voice signal of the user utterance voice obtained through the conversion. The acoustic signal outputted from the microphone 11 is inputted to the utterance end estimation part 61, the utterance end determination part 63 and the voice recognition part 21 of the action recognition part 20. Furthermore, the input part 10 is, for example, a camera 12 that records physical operation of the user and converts the recorded physical operation to a video signal. When the input part 10 is a camera, the input part 10 may be enabled to record physical operation of the user 101. That is, FIG. 1 is an example, and the camera 12 may be one camera or a plurality of cameras. The camera 12 outputs the video signal of the user's physical operation obtained through the conversion. The video signal outputted by the camera 12 is inputted to the utterance end estimation part 61, the utterance end determination part 63 and the operation recognition part 22 of the action recognition part 20.

The action recognition part 20 receives at least one of the acoustic signal collected by the microphone 11 and the video signal of the user's physical operation recorded by the camera 12 as input, obtains information representing contents of the user's action including at least one of the text representing contents of the user utterance obtained by the voice recognition part 21 using at least one of the voice recognition part 21 and the operation recognition part 22 and information representing the user's operation contents obtained by the operation recognition part 22 and outputs the information to the utterance decision part 30.

The voice recognition part 21 converts the voice signal of the user utterance voice included in the acoustic signal inputted from the microphone 11 to text representing contents of the user utterance and outputs the text. The text representing contents of the user utterance outputted from the voice recognition part 21 is included in the information representing contents of the user's action outputted from the action recognition part 20. The voice recognition method carried out by the voice recognition part 21 may be any existing voice recognition technique and an optimum method may be selected as appropriate according to a usage environment or the like. A configuration may also be adopted in which the voice recognition part 21 obtains an acoustic signal corresponding to a section where a human utterance voice is present from the inputted acoustic signal as a voice signal of the human utterance voice, applies a voice recognition technique to the obtained voice signal of the human utterance voice, and thereby obtains text representing contents of the user utterance.

The operation recognition part 22 converts the video signal of the user's physical operation inputted from the camera 12 to information representing contents of the user's operation and outputs the information. The information representing contents of the user's operation outputted from the operation recognition part 22 is included in the information representing contents of the user's action outputted from the action recognition part 20. The method of operation recognition carried out by the operation recognition part 22 is, for example, a method using a change in the user's expressions or the like. In this method, the operation recognition part 22 acquires time-series images of the user's face from the inputted video signal and acquires contents of the user's operation which are variations of features (e.g., size of the pupil, position of the tail of the eye, positions of the eyes, position of angle of mouth, degree of opening of mouth) from the acquired time-series images. The operation recognition part 22 obtains contents of the user's operation corresponding to each time in the inputted video signal, generates time-series data representing the contents of the user's operation and outputs the generated time-series data as information representing the contents of the user's operation. However, the above-described operation recognition method is an example and the method of operation recognition carried out by the operation recognition part 22 may be any existing operation recognition technique and an optimum method may be selected as appropriate in accordance with the usage environment or the like.

The utterance decision part 30 decides text representing the utterance contents from the dialog system 100 and outputs the text to the voice synthesis part 40. When the information representing contents of the user's action is inputted from the action recognition part 20, the utterance decision part 30 decides the text representing the utterance contents from the dialog system 100 based on the inputted information representing contents of the user's action and outputs the text to the voice synthesis part 40. Note that when the presentation part 50 of the dialog system 100 is constructed of a plurality of humanoid robots, the utterance decision part 30 may decide which humanoid robot presents the utterance. In this case, the utterance decision part 30 also outputs information indicating the humanoid robot that presents the utterance together to the voice synthesis part 40. In this case, the utterance decision part 30 may decide the partner to whom the utterance is presented, that is, whether the utterance is presented to the user or to any one humanoid robot. In this case, the utterance decision part 30 outputs the information indicating the partner to whom the utterance is presented together to the voice synthesis part 40.

The voice synthesis part 40 converts text representing the utterance contents inputted from the utterance decision part 30 or the action decision part 62 to a voice signal representing the utterance contents and outputs the voice signal to the presentation part 50. The method for voice synthesis carried out by the voice synthesis part 40 can be any existing voice synthesis technique and a most suitable one may be selected as appropriate in accordance with the usage environment or the like. Note that when information indicating the humanoid robot that presents the utterance is inputted from the utterance decision part 30 or the action decision part 62 together with the text representing the utterance contents, the voice synthesis part 40 outputs a voice signal representing the utterance contents to the humanoid robot corresponding to the information. Furthermore, when information indicating a partner to whom the utterance is presented is also inputted together with the text representing the utterance contents and information indicating the humanoid robot that presents the utterance from the utterance decision part 30 or the action decision part 62, the voice synthesis part 40 outputs the voice signal representing the utterance contents and the information indicating the partner to whom the utterance is presented to the humanoid robot corresponding to the information.

The presentation part 50 is an interface for the utterance decision part 30 or the action decision part 62 to present the decided utterance contents to the user. For example, the presentation part 50 is a humanoid robot manufactured by imitating the human form. This humanoid robot pronounces the voice corresponding to a voice signal representing the utterance contents outputted by the voice synthesis part 40 from the speaker 51 mounted on, for example, the head. That is, the humanoid robot presents the utterance. The speaker 51 may be enabled to pronounce the voice corresponding to the voice signal representing the utterance contents inputted from the voice synthesis part 40. That is, FIG. 1 is an example and either one of the speaker 51-1 or 51-2 may not be provided. A configuration may also be adopted in which one or more speakers or a speaker array provided with a plurality of speakers are provided in places different from the humanoid robots 50-1 and 50-2 in the vicinity of the user 101 or the like, but both the speakers 51-1 and 51-2 are not provided. Furthermore, the humanoid robot may present the utterance contents decided by the utterance decision part 30 or the action decision part 62 through nonverbal action such as facial expressions and physical movement to the user. For example, nonverbal action may be presented such as nodding the head vertically to present an agreement on an immediately preceding utterance or shaking the head horizontally to present a disagreement. When the presentation part 50 is a humanoid robot, one humanoid robot is provided for each personality joining the dialog, for example. Hereinafter, it is assumed that there are two humanoid robots 50-1 and 50-2 as an example where two personalities join the dialog. Note that when the utterance decision part 30 has already decided from which humanoid robot the utterance is presented, the humanoid robot 50-1 or 50-2 which receives a voice signal representing the utterance contents outputted from the voice synthesis part 40 presents the utterance. When the information indicating the partner to whom the utterance decided by the utterance decision part 30 or the action decision part 62 is presented is also inputted, the humanoid robot 50-1 or 50-2 presents the utterance while directing its face or eyes in the utterance of the humanoid robot or user corresponding to the information indicating the partner to whom the utterance is presented.

Note that the presentation part 50 may also be enabled to perform non-verbal action such as nodding, winking, changing the eyes, moving the hands or the like based on action-related information to fill the gap decided by the action decision part 62. Processing of the presentation part 50 will be described later.

Figure 2:
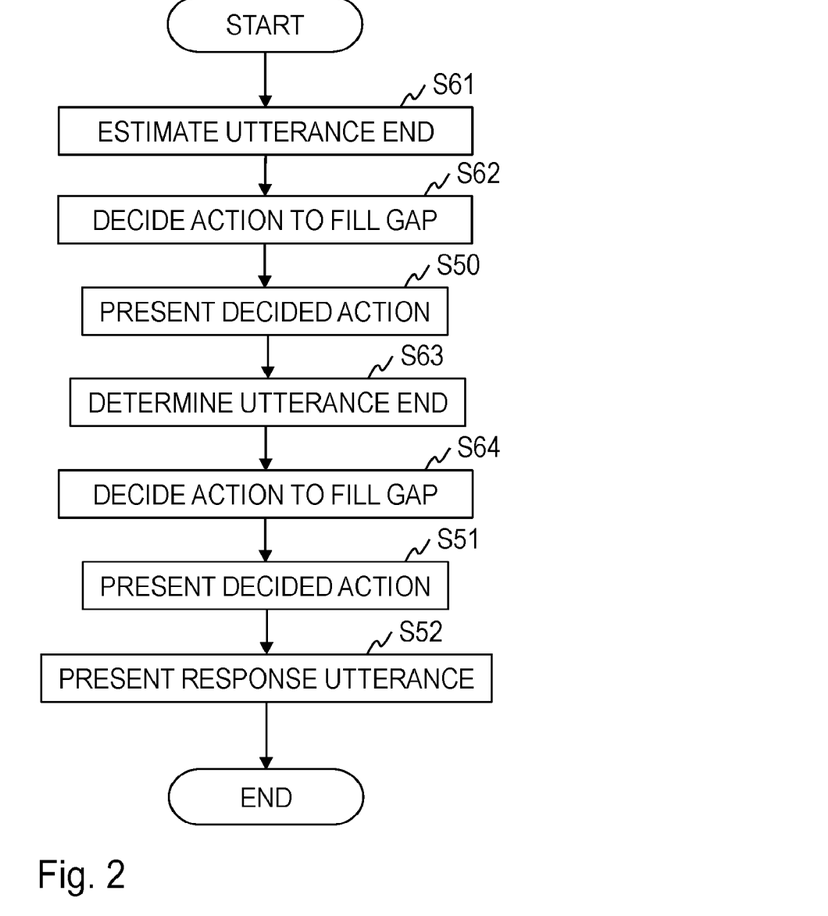
FIG. 2 is a diagram illustrating a processing procedure of a dialog method of the embodiment.

Hereinafter, a processing procedure of the dialog method of the embodiment will be described with reference to FIG. 2.

The utterance end estimation part 61 receives at least one of the acoustic signal collected by the microphone 11 and the video signal of the user's physical operation recorded by the camera 12 as input and estimates whether or not the user utterance has ended (step S61). When it is estimated that the user utterance has ended, the utterance end estimation part 61 outputs an estimation result to that effect to the action decision part 62.

For example, when it is detected that the voice of the user utterance has disappeared, the utterance end estimation part 61 estimates that the user utterance has ended. For example, when the length of the time period during which the amplitude of the acoustic signal collected by the microphone 11 or the magnitude of power or the like has fallen below a predetermined threshold (first threshold, amplitude threshold) exceeds a predetermined threshold (second threshold, first time threshold), the utterance end estimation part 61 determines that the voice of the user utterance has disappeared.

The utterance end estimation part 61 may also estimate that the user utterance has ended using a VAD (Voice Activity Detection) technique. For example, the utterance end estimation part 61 performs a VAD on the acoustic signal collected by the microphone 11 and estimates that the user utterance has ended when it is determined through the VAD that a voice section has ended.

The VAD technique is a technique for distinguishing a section of the observed acoustic signal where a voice is present from the other section. Examples of known methods of implementing the VAD technique include a method based on amplitude of a voice waveform and zero crossing, a section detection based on voice/non-voice identification in frame units based on a Gaussian mixture model and a decoder-based VAD that detects sections based on hypothetical information under recognition by a decoder (e.g., see Reference Document 1).

[Reference Document 1] Masakiyo Fujimoto, "The Fundamentals and Recent Progress of Voice Activity Detection," The Institute of Electronics, Information and Communication Engineers technological research report, SP, voice 110 (81), 7-12, 2010-06-10

The utterance end estimation part 61 may also estimate whether or not the user utterance has ended using other techniques. For example, the utterance end estimation part 61 may estimate whether or not the user utterance has ended based on the user's eyes in the video corresponding to the video signal of the inputted user's physical operation.

Note that the utterance end estimation part 61 may also estimate that the user utterance will end using a technique for predicting a time at which the user utterance will end using at least one of the inputted acoustic signal and video signal. In this case, the utterance end estimation part 61 also acquires information on the predicted time at which the user utterance will end and outputs the information to the presentation part 50.

When the utterance end estimation part 61 estimates that the user utterance has ended or will end, the action decision part 62 decides an action to fill the gap between the user utterance and a response utterance of the dialog system 100 (step S62). The action decision part 62 outputs information on the decided action to fill the gap to at least one of the presentation part 50 and the voice synthesis part 40. The action to fill the gap between the user utterance and the response utterance of the dialog system 100 is at least one of a verbal action and a non-verbal action.

The utterance end estimation part 61 may estimate that the user utterance has ended or will end even if the user utterance has not actually ended. Thus, when the utterance end estimation part 61 estimates that the user utterance has ended or will end, the action carried out by the presentation part 50 to fill the gap is preferably not an action that the user has an uncomfortable feeling or the user stops the continued utterance but an action that will not obstruct the continuation of the user utterance if the user utterance has not actually ended and the user continues the utterance. Thus, when the utterance end estimation part 61 estimates that the user utterance has ended or will end, the action decision part 62 decides a verbal action or a non-verbal action, which will be described below, as the action to fill the gap.

When the action to fill the gap between the user utterance and the response utterance of the dialog system 100 is a verbal action, the action decision part 62 decides the verbal action to fill the gap and outputs text of the decided verbal action to the voice synthesis part 40 as information on the action to fill the gap. In this case, the voice synthesis part 40 generates a voice signal corresponding to the inputted text of the verbal action based on the inputted information on the action to fill the gap, that is, based on the inputted text of the verbal action and outputs the generated voice signal to the presentation part 50.

When the utterance end estimation part 61 estimates that the user utterance has ended or will end, the verbal action to fill the gap between the user utterance and the response utterance of the dialog system 100 is, for example, nodding with a voice such as "yeah."

When the action to fill the gap between the user utterance and the response utterance of the dialog system 100 is a non-verbal action, the action decision part 62 decides the non-verbal action to fill the gap and outputs control information for causing the presentation part 50 to perform the decided non-verbal action to the presentation part 50 as information on the action to fill the gap. When the utterance end estimation part 61 estimates that the user utterance has ended or will end, the non-verbal action to fill the gap between the user utterance and the response utterance of the dialog system 100 is, for example, operation such as the humanoid robot 50-1 or 50-2 nodding, inclining its head or lowering its head thoughtfully. In this case, the action decision part 62 outputs control information for causing the humanoid robot 50-1 or 50-2 to perform operation such as nodding, inclining its head or lowering its head thoughtfully to the humanoid robot 50-1 or 50-2.

The action to fill the gap between the user utterance and the response utterance of the dialog system 100 may be an action carried out between a first personality which is a certain personality and a second personality which is different from the first personality. For example, the first personality corresponds to the humanoid robot 50-1 and the second personality corresponds to the humanoid robot 50-2. In this case, the action decision part 62 further outputs information indicating which of the humanoid robot 50-1 or 50-2 performs the action decided by the action decision part 62 to at least one of the voice synthesis part 40 and the presentation part 50.

Examples of actions carried out between the first personality and the second personality include "facing each other," "turning to the other robot so as to encourage an utterance" (e.g., the one looking at the other with nodding and then the looked other robot responding back with nodding), "the one showing a gesture as if noticing something, the other looking at the one, both facing each other and the one showing such a gesture looking at the user."

The action decision part 62, for example, arbitrarily selects an action to fill the gap from among predetermined standard actions stored in a storage part (not shown) in the action decision part 62, and thereby decides it as the action to fill the gap.

The presentation part 50 presents an action to fill the gap between the user utterance and the response utterance of the dialog system 100 based on at least one of information on the action to fill the gap decided by the action decision part 62 in step S62 and the voice signal generated by the voice synthesis part 40 or based on the information on a predicted time at which the user utterance ends when the utterance end estimation part 61 also outputs information on the predicted time at which the user utterance ends, after the user utterance is estimated as having ended or after the predicted time at which the user utterance ends, and before the dialog system 100 makes a response utterance to the user utterance (step S50). When information indicating which of the humanoid robot 50-1 or 50-2 performs the action decided by the action decision part 62 is inputted to the presentation part 50, the presentation part 50 presents an action for the humanoid robot defined based on the information to fill the gap.

The utterance end determination part 63 receives at least one of the acoustic signal collected by the microphone 11 and the video signal of the user's physical operation recorded by the camera 12 as input and determines whether or not the user utterance has ended (step S63). When it is determined that the user utterance has ended, the utterance end determination part 63 outputs the determination result to the action decision part 62.

For example, when it is detected that time has passed for a while after the voice of the user utterance disappeared, the utterance end determination part 63 determines that the user utterance has ended. For example, when the length of the time period during which the magnitude of the acoustic signal collected by the microphone 11 falls below a predetermined threshold (first threshold) exceeds a predetermined threshold (third threshold, second time threshold), the utterance end determination part 63 determines that the voice of the user utterance has disappeared. Here, the third threshold (second time threshold) is a value greater than the second threshold (first time threshold) of the utterance end estimation part 61.

The utterance end determination part 63 may also determine whether or not the user utterance has ended based on a moving image of, for example, the movement of the user's mouth and lowering or raising of the microphone included in the inputted video signal. Furthermore, for example, it is also possible to determine whether or not the user utterance has ended using sensor information acquired by a sensor (not shown) in addition to the acoustic signal or the video signal. It is possible to determine an end of the utterance by simultaneously using a plurality of information pieces such as the acoustic signal, the video signal and the sensor information more accurately than using only the acoustic signal.

When the utterance end decision part 63 determines that the user utterance has ended, the action decision part 62 decides the action to fill the gap between the user utterance and the response utterance of the dialog system 100 (step S64). The action decision part 62 outputs information on the decided action to fill the gap to at least one of the presentation part 50 and the voice synthesis part 40.

The action to fill the gap between the user utterance and the response utterance of the dialog system 100 is at least one of the verbal action and the non-verbal action.

The utterance end determination part 63 hardly determines that the user utterance has ended although the user utterance has not actually ended. Thus, when the utterance end determination part 63 determines that the user utterance has ended, the action to fill the gap carried out by the presentation part 50 is preferably an action to express that the dialog system 100 has recognized the end of the user utterance and an action to express that the dialog system 100 has listened to the user utterance or the like. Thus, when the utterance end decision part 63 determines that the user utterance has ended, the action decision part 62 decides an action, a generation time of which is shorter than the generation time of a response dialog by the utterance decision part 30 of the dialog system 100 as an action to fill the gap.

When the action to fill the gap between the user utterance and the response utterance of the dialog system 100 is a verbal action, the action decision part 62 decides a verbal action to fill the gap and outputs text of the decided verbal action to the voice synthesis part 40 as information on the action to fill the gap. In this case, the voice synthesis part 40 generates a voice signal corresponding to the text of the inputted verbal action based on the information on the inputted action to fill the gap, that is, based on the text of the inputted verbal action and outputs the generated voice signal to the presentation part 50.

When the utterance end determination part 63 determines that the user utterance has ended, the verbal action to fill the gap between the user utterance and the response utterance of the dialog system 100 is an utterance, a generation time of which is shorter than the generation time of a response dialog by the utterance decision part 30 of the dialog system 100. The utterance, a generation time of which is shorter than the generation time of a response dialog by the utterance decision part 30 of the dialog system 100 is, for example, an utterance using part of the user utterance such as repetition of part of the user utterance.

For example, as will be described later, when the text representing contents of the user utterance outputted from the voice recognition part 21 is "lightly roasted bonito was delicious," the action decision part 62 decides the text "speaking of the lightly roasted bonito" which is an utterance using a wording included in the text representing contents of the user utterance as the utterance with a short generation time as information on the action to fill the gap and outputs the text to the voice synthesis part 40. The utterance of "speaking of the lightly roasted bonito" uses the wording "lightly roasted bonito" in the utterance of the user's "lightly roasted bonito was delicious," and so such an utterance can be generated in a shorter generation time.

The action decision part 62 may describe, for example, a word included in the user utterance as a trigger in advance and decide text of verbal action to fill the gap according to a rule stored in the storage part (not shown) in the action decision part 62 or may automatically generate a rule based on words in a co-occurrence relation or a dependency relation with words included in the user utterance and decide a verbal action to fill the gap between the texts to fill the gap according to the rule.

In this way, the action decision part 62 may decide the verbal action to fill the gap in accordance with contents of utterances up to the immediately preceding utterance.

Note that the utterance, a generation time of which is shorter than the generation time of the response dialog by the utterance decision part 30 of the dialog system 100 may be a verbal action similar to that in step S62, that is, nodding with a voice such as "yeah."

When the action to fill the gap between the user utterance and the response utterance of the dialog system 100 is a non-verbal action, the action decision part 62 decides a non-verbal action to fill the gap and outputs control information for causing the presentation part 50 to perform the decided non-verbal action to the presentation part 50 as information on the action to fill the gap.

When the utterance end determination part 63 determines that the user utterance has ended, the non-verbal action to fill the gap between the user utterance and the response utterance of the dialog system 100 is a non-verbal action, a generation time of which is shorter than the generation time of the response dialog by the utterance decision part 30 of the dialog system 100. The non-verbal action, a generation time of which is shorter than the generation time of the response dialog by the utterance decision part 30 of the dialog system 100 is, for example, a non-verbal action similar to the non-verbal action decided, for example, in step S62.

The presentation part 50 presents an action to fill the gap between the user utterance and the response utterance of the dialog system 100 based on at least one of information on the action to fill the gap decided by the action decision part 62 in step S64 and the voice signal generated by the voice synthesis part 40, after determining that the user utterance has ended and before the dialog system 100 makes a response utterance to the user utterance (step S51). Note that when the dialog system attempts to present an action in step S51, if the presentation of the action in step S51 has not ended, the presentation part 50 presents the action to fill the gap between the user utterance and the response utterance of the dialog system 100 after the presentation of the action in step S50 ends.

When the utterance end determination part 63 determines that the user utterance has ended, the utterance decision part 30 decides text representing utterance contents of the response, the voice synthesis part 40 generates a voice signal corresponding to the text, and the presentation part 50 presents the voice signal (step S52). Note that when the presentation part 50 attempts to present the voice signal to the user, if the presentation of an action in step S50 or step 51 has not ended yet, the voice signal is presented after the presentation of the action in step S50 or step 51 ends.

Note that the determination process by the utterance end determination part 63 as to whether or not the user utterance has ended is executed simultaneously or in parallel with the estimation process by the utterance end estimation part 61 as to whether or not the user utterance has ended. Furthermore, the generation process of the response utterance by the utterance decision part 30 is executed simultaneously or in parallel with the process in step S64 by the action decision part 62.

Generally, the time required for the estimation process as to whether or not the user utterance has ended is shorter than a first delay time $\tau 3$-$\tau 2$ required for the determination process as to whether or not the user utterance has ended.

Figure 4:
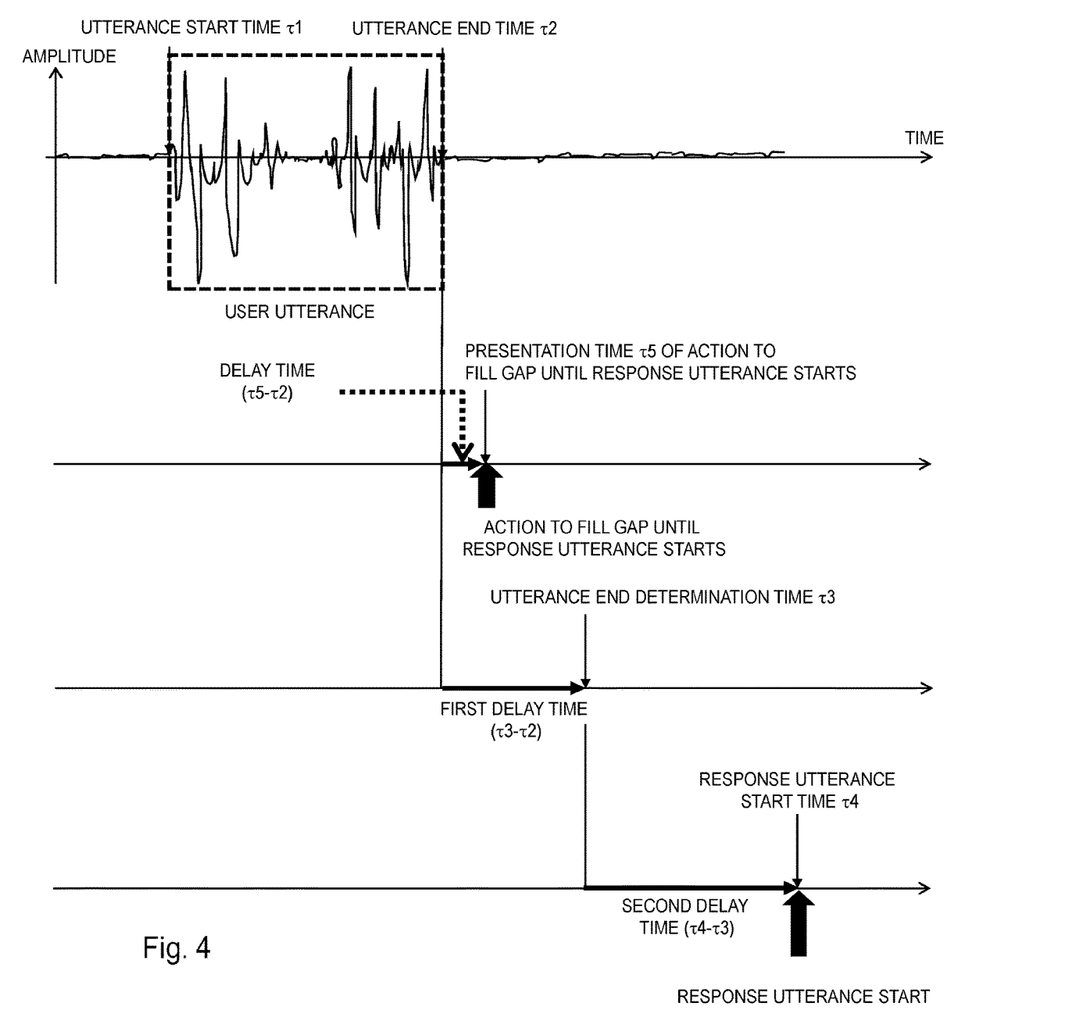
FIG. 4 is a diagram for describing effects of the embodiment.

Thus, as shown in FIG. 4, an action presentation time τ5 which is a presentation time of the action performed to fill the gap without any delay after it is successfully estimated that the user utterance has ended until a response utterance starts precedes an utterance end determination time τ3 which is a time at which the utterance end determination part 63 determines that the user utterance has ended.

For this reason, after it is estimated or determined that the user utterance has ended and before the dialog system 100 makes a response utterance to the user utterance, an action to fill the gap between the user utterance and the response utterance of the dialog system 100 is presented, and it is thereby possible to reduce the user's uncomfortable feeling due to a slow response dialog.

In the example in FIG. 4, although it conventionally takes a delay time of τ4-τ2 until the dialog system 100 does some reaction to the user utterance, the above-described embodiment can reduce this delay time to τ5-τ2.

Note that it is possible to adopt a configuration in which if step S61, step S62 and step S50 described above are executed, step S64 and step S51 described above need not be executed. In other words, the dialog system 100 need not be provided with the utterance end determination part 64. With such a configuration, it is also possible to reduce the user's uncomfortable feeling due to the slow response dialog by presenting an action to fill the gap between the user utterance and the response utterance of the dialog system 100 before the dialog system 100 makes a response utterance to the user utterance.

A configuration may also be adopted in which step S61, step S62 and step S50 described above are not executed if step S64 and step S51 described above are executed. In other words, the dialog system 100 need not be provided with the utterance end estimation part 61. With such a configuration, it is also possible to reduce the user's uncomfortable feeling due to the slow response dialog by presenting an action to fill the gap between the user utterance and the response utterance of the dialog system 100 before the dialog system 100 makes a response utterance to the user utterance.

Specific Examples

Hereinafter, specific examples of dialog contents according to the embodiment will be described. Here, "R" represents a robot and "H" represents a user. A number after "R" is an identifier of a humanoid robot. t(i) (i=0, 1, 2, . . . ) represents an action during a dialog (when the action is a verbal action, t(i) represents an utterance). An action in parentheses represents that the dialog system 100 preferably presents the action as a less disturbing action. When the action in parentheses is a verbal action, for example, the voice synthesis part 40 outputs a voice signal of a less disturbing utterance stored in the storage part (not shown) in the voice synthesis part 40 to the presentation part 50, and the action can thereby be presented by the humanoid robots 50-1 and 50-2 which correspond to the presentation part 50. The voice signal of a less disturbing utterance is a voice signal of an utterance indicating that there is no intention to disturb the user utterance obtained by toning down the voice compared to a voice signal of an ordinary utterance used for a dialog to be, for example, small volume, fast-paced and thin-voiced.

t(0) H: I visited Kochi the other day
t(1) R1: (Yeah)
t(2) H: Lightly roasted bonito was delicious (then, suppose, there was no H voice for a predetermined time interval (e.g., on the order of 0.2 seconds, corresponding to "second threshold")).
t(3) R1: R1 turns to R2.
t(4) R2: (Hey) (then, suppose, there was no H voice for a predetermined time interval (e.g., on the order of 1 second, corresponding to "third threshold")).
t(5) R2: Speaking of the lightly roasted bonito, and R2 turns to R1.
t(6) R1: The grilled one was delicious.

In this example, since there was no voice of the user H for a predetermined time interval from the user H after the second utterance t(2), the user utterance is estimated to end. Therefore, the robot R1 performs a third action t(3) which is a non-verbal action of the robot R1 turning to the robot R2, and in response to this, the robot R2 performs a fourth action t(4) which is a verbal action expressing that the robot R1 is listening to the utterance of the user H saying "(Hey)" and further the robot R2 performs a fifth action t(5) which is an action combining a verbal action of "speaking of the lightly roasted bonito" and a non-verbal action of "turning to R1." Finally, the robot R1 performs a sixth utterance t(6) as an official response to the second utterance t(2) from the user H.

The third action t(3) to the fifth action t(5) are actions to fill the gap between the user utterance and the response utterance of the dialog system 100 (sixth utterance (6) in this example).

For example, when the third action t(3) is taken as an example, through the third action t(3) of the robot R1 turning to the robot R2, it is possible to make the user H think that the robot R1 is encouraging the robot R2 to make an utterance. Therefore, even when there is no official response utterance of the dialog system 100 from the user H to the second utterance t(2), the user's uncomfortable feeling is hardly generated.

As shown in this example, the action to fill the gap may be at least one verbal action or non-verbal action or include an action performed between a first personality which is a certain personality (robot R1 in this example) and a second personality which is different from the first personality (robot R2 in this example).

As shown in this example, an action to fill the gap is constructed of a plurality of actions and an action involving turn changes, and it is thereby possible to gain time until a response utterance is made more naturally.

Modifications

Although an example has been described in the aforementioned embodiments where a dialog is conducted with voices using humanoid robots as agents, the presentation part of the aforementioned embodiments may be a humanoid robot having a physical body or the like or a robot without any physical body or the like.

Although the embodiments of the present invention have been described so far, the specific configuration is not limited to these embodiments, and it goes without saying that design changes or the like made as appropriate without departing from the spirit and scope of the present invention are included in the present invention. The various processes described above in the embodiments may be executed not only in time-sequentially according to the description order, but also in parallel or individually according to a processing capacity of the apparatus that executes the processes or as required.

Program and Recording Medium

When the various processing functions of the respective apparatuses described in the above-described embodiments are implemented by a computer, processing contents of the functions that should be possessed by the respective apparatuses are written by a program. Furthermore, the various processing functions of the respective apparatuses are implemented on the computer by executing the program on the computer.

The program that writes the processing contents can be recorded in a computer-readable recording medium. Examples of the computer-readable recording medium include a magnetic recording apparatus, an optical disk, a magneto-optical recording medium, a semiconductor memory or any medium.

This program is distributed through, for example, sales, transfer or rental of a portable recording medium such as DVD or CD-ROM that records the program. The program may also be distributed by storing the program in a storage apparatus of a server computer, and transferring the program from the server computer to another computer.

The computer that executes such a program temporarily stores a program recorded in a portable storage medium or a program transferred from the server computer in the own storage apparatus. At the time of execution of the process, this computer reads the program stored in the own storage apparatus and executes the process according to the read program. As another form of execution of the program, the computer may read the program directly from a portable recording medium and execute the process according to the program. Furthermore, every time the program is transferred to the computer from the server computer, the process may be executed successively according to the received program. The above-described process may be executed by a so-called ASP (Application Service Provider) type service in which without the server computer transferring the program to the computer, the processing function is implemented only by instructing execution and acquiring the result. Note that the program in the present form includes a semi-program which is information used for processing by a computer (data which is not a direct instruction on the computer but has a characteristic of defining processing of the computer).

In this form, although each apparatus is configured by executing a predetermined program on the computer, at least some of these processing contents may be implemented by hardware.

DESCRIPTION OF REFERENCE NUMERALS

1 Utterance apparatus
10 Input part
11 Microphone
20 Action recognition part
21 Voice recognition part
22 Operation recognition part
30 Utterance decision part
40 Voice synthesis part
50 Presentation part
51 Speaker
52 Camera
61 Utterance end estimation part
62 Action decision part
63 Utterance end determination part
100 Dialog system
101 User

What is claimed is:

1. A dialog system that conducts a dialog with a user, the dialog system comprising:
a presentation part that presents an action to fill a gap between a user utterance and a response utterance of the dialog system after the user utterance is estimated or determined as having ended or after a predicted time at which the user utterance is predicted to end, and before the dialog system makes a response utterance to the user utterance,
wherein when an elapsed time after a voice of the user utterance disappears is longer than a first time threshold, the dialog system estimates an end of the user utterance and when the elapsed time after the voice of the user utterance disappears is longer than a second time threshold which is longer than the first time threshold, the dialog system determines an end of the user utterance.

2. A dialog system that conducts a dialog with a user, the dialog system comprising:
a presentation part that presents an action to fill a gap between a user utterance and a response utterance of the dialog system after the user utterance is estimated or determined as having ended or after a predicted time at which the user utterance is predicted to end, and before the dialog system makes a response utterance to the user utterance,
wherein the action to fill the gap includes an action to fill the gap performed by a first agent which is a certain agent and an action to fill the gap performed by a second agent which is different from the first agent.

3. A dialog method executed by a dialog system that conducts a dialog with a user, the method comprising:
a step in which a presentation part of the dialog system presents an action to fill a gap between a user utterance and a response utterance of the dialog system after the dialog system estimates or determines an end of the user utterance or after a predicted time at which the user utterance ends and before the dialog system performs a response utterance to the user utterance,
wherein when an elapsed time after a voice of the user utterance disappears is longer than a first time threshold, the dialog system estimates an end of the user utterance and when the elapsed time after the voice of the user utterance disappears is longer than a second time threshold which is longer than the first time threshold, the dialog method determines an end of the user utterance.

4. A dialog apparatus that decides an action to be presented by a dialog system comprising at least a presentation part that presents the action, the dialog apparatus comprising:
an action decision part that decides an action to fill a gap between a user utterance and a response utterance of the dialog system presented by the presentation part after the dialog system estimates or determines an end of the user utterance or after a predicted time at which the user utterance ends and before the dialog system performs a response utterance to the user utterance,
wherein when an elapsed time after a voice of the user utterance disappears is longer than a first time threshold, the dialog system estimates an end of the user utterance and when the elapsed time after the voice of the user utterance disappears is longer than a second time threshold which is longer than the first time threshold, the dialog apparatus determines an end of the user utterance.

5. A dialog method executed by a dialog system that conducts a dialog with a user, the method comprising:
a step in which a presentation part of the dialog system presents an action to fill a gap between a user utterance and a response utterance of the dialog system after the dialog system estimates or determines an end of the user utterance or after a predicted time at which the user utterance ends and before the dialog system performs a response utterance to the user utterance, wherein the action to fill the gap includes an action to fill the gap performed by a first agent which is a certain agent and an action to fill the gap performed by a second agent which is different from the first agent.

6. A dialog apparatus that decides an action to be presented by a dialog system comprising at least a presentation part that presents the action, the dialog apparatus comprising:

an action decision part that decides an action to fill a gap between a user utterance and a response utterance of the dialog system presented by the presentation part after the dialog system estimates or determines an end of the user utterance or after a predicted time at which the user utterance ends and before the dialog system performs a response utterance to the user utterance, wherein the action to fill the gap includes an action to fill the gap performed by a first agent which is a certain agent and an action to fill the gap performed by a second agent which is different from the first agent.

7. A non-transitory computer-readable recording medium in which a program for causing a computer to execute each step of the dialog method according to claim 3 or 5.

8. A non-transitory computer-readable recording medium in which a program for causing a computer to function as the dialog apparatus according to claim 4 or 6.

* * * * *